Figure 1:
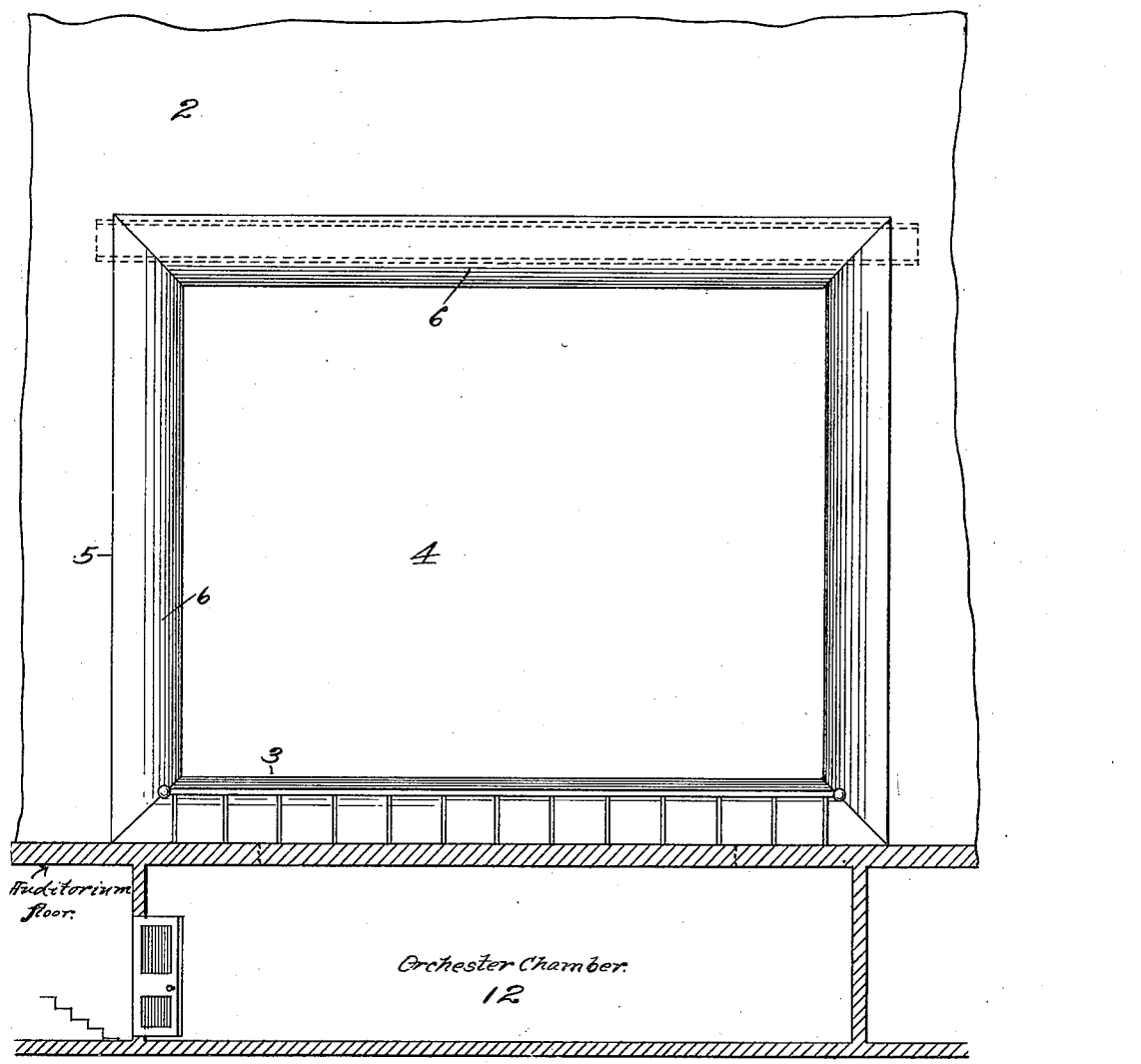

H. W. BISHOP.
PROSCENIUM STRUCTURE.
APPLICATION FILED APR. 27, 1914.

1,136,860.

Patented Apr. 20, 1915.
2 SHEETS—SHEET 1.

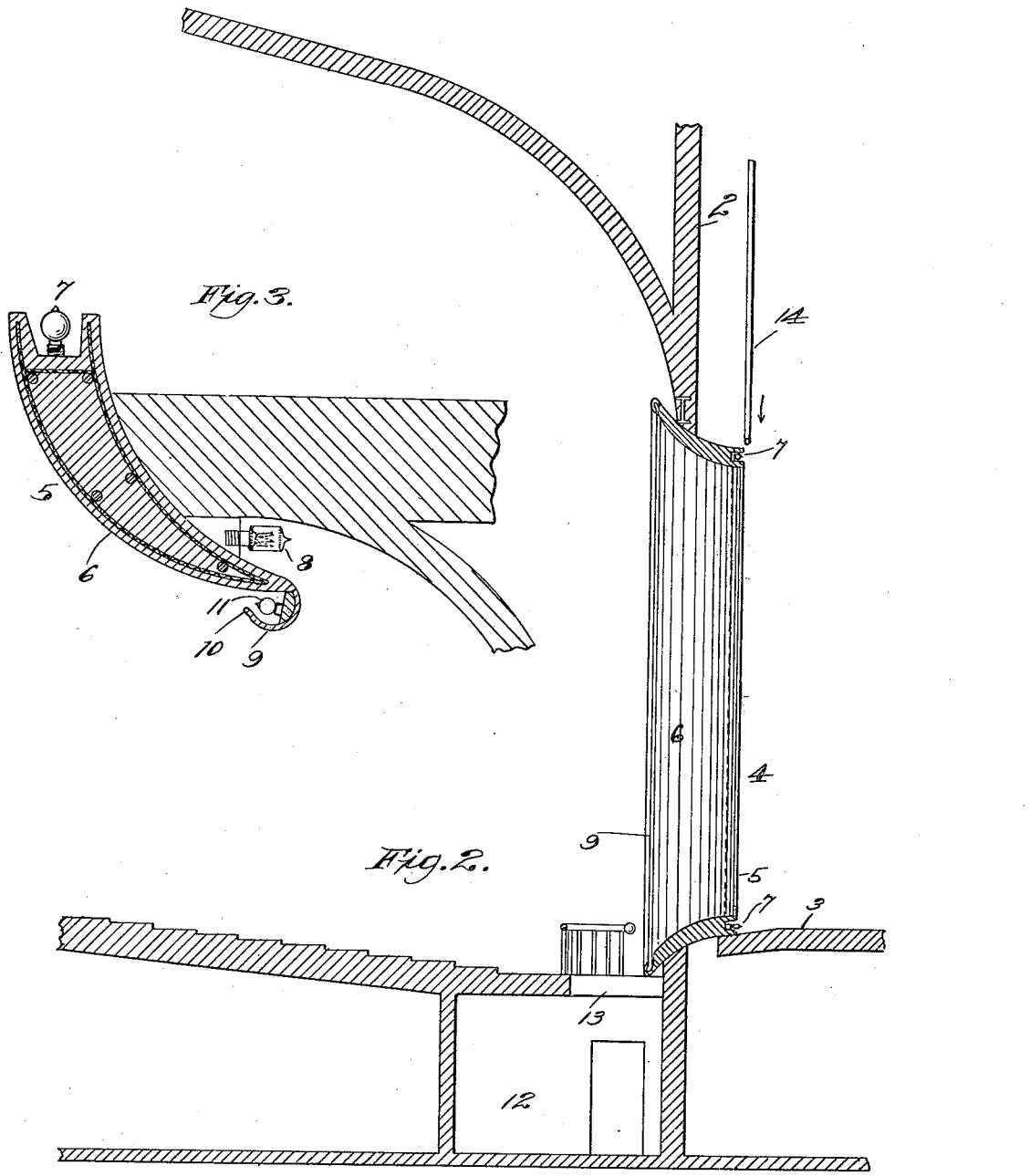

UNITED STATES PATENT OFFICE.

HARRY W. BISHOP, OF OAKLAND, CALIFORNIA.

PROSCENIUM STRUCTURE.

1,136,860. Specification of Letters Patent. Patented Apr. 20, 1915.

Application filed April 27, 1914. Serial No. 834,625.

*To all whom it may concern:*

Be it known that I, HARRY W. BISHOP, a citizen of the United States, residing at Oakland, in the county of Alameda and State of California, have invented new and useful Improvements in Proscenium Structures, of which the following is a specification.

This invention relates to theater construction and particularly to a proscenium structure.

The object of this invention is to provide an improved proscenium wall with an opening of suitable proportions in front of the stage, the opening being surrounded by a frame structure peculiarly arranged, formed, and designed, and which may be of fireproof structure.

The invention consists of a frame structure surrounding the proscenium opening and the proscenium structure.

Referring to the accompanying drawings—Figure 1 is a front view of the structure. Fig. 2 is a central vertical section. Fig. 3 is a detail sectional view of the frame.

A portion of the proscenium wall is shown at 2 in front of the stage 3. The opening 4, which may be of suitable form and size, is shown as entirely surrounded on its sides with a frame structure 5.

This invention resides particularly in the frame and the means combined therewith for illumination purposes.

Preferably the frame 5 has its visible surfaces 6 converging from its front or foremost edges or periphery in front of the wall 2 inwardly or rearwardly toward the stage space. The lower edge of the frame preferably is disposed close to the auditorium floor from which the lower horizontal surface of the frame rises upwardly and inwardly and terminates about the plane of the stage 3. Thus from the point of view of the auditorium the frame forms a border surrounding the opening with an inwardly converging surface entirely obliterating the usual sharp corner at the front edge of the stage and orchestra pit. The effect of this frame upon the mind of an observer is that the scene presented is in reality a picture with living characters.

The frame is shown in cross section as of concavo-convex contour and of such a depth from the front to the rear edge that it projects somewhat in front and behind the wall 2. The rear edge of the frame is recessed or provided with pockets for lamps 7 which illuminate the stage and adjacent property. That portion or rear margin of the frame which projects beyond the wall 2 affords also a shield for operators, hands and various paraphernalia. The front, outwardly diverging rim of the frame may be provided on its rear surface, where it projects beyond the front of the wall 2, with a lamp 8 for indirect illumination, the light being reflected from the adjacent wall surface.

For illuminating the front visible frame surface 6 the frame may be provided with an anterior fold or lamp guard 9, the edge 10 of which is spaced from the contiguous surface sufficiently to permit light from concealed lamps 11 to fall upon the frame surface.

To further carry out the picture effect of the framed proscenium the orchestra or orchestrion may be located in a pit 12, Fig. 2, below the auditorium floor, which is provided with a sufficient sound shaft 13 adjacent to the lower front edge of the frame 5. Thus the psychological picture impression is unmarred and complete.

The ultimate purpose of my invention is to produce upon the mind an impression of the picturesque, unmechanical production and to eliminate the rigidness given by architectural ornamentation common to arch work and prosceniums. This is enhanced by providing a curtain 14 movable just behind the rear edge of the frame 5 and which may be decorated with a scene harmonious and introductory to the arrangement of property on the stage so that when the curtain rises the transition is a continuation of the introductory scene on the curtain.

Having thus described my invention, what I claim and desire to secure by Letters Patent is—

1. In a stage structure, in combination with the proscenium wall and the opening therein, a frame fitted within the opening and having an exposed convex surface which extends on opposite sides of the front and rear faces of the wall and across the bounding walls which define the opening, said convex face converging from the front to the rear thereof and having its front extended over and across the front face of the proscenium wall.

2. In a stage structure, in combination with the proscenium wall and the opening therein, a frame fitted within the opening and having an exposed convex surface which extends on opposite sides of the front and rear faces of the wall and across the bounding walls which define the opening, said convex face converging from the front to the rear thereof and having its front extended over and across the front face of the proscenium wall, the bottom side of the frame terminating at points in close relation to the auditorium floor.

3. In a stage structure, in combination with the proscenium wall and the opening therein, a frame fitted within the opening and having an exposed convex surface which extends on opposite sides of the front and rear faces of the wall and across the bounding walls which define the opening, said convex face converging from the front to the rear thereof and having its front extended over and across the front face of the proscenium wall, the rear edge of the frame having a recessed portion and the front edge of the frame having an extension which is curved inwardly to project over the exposed surface of the frame in spaced relation thereto.

In testimony whereof I have hereunto set my hand in the presence of two subscribing witnesses.

HARRY W. BISHOP.

Witnesses:
W. W. HEALEY,
M. KANDERES.

Copies of this patent may be obtained for five cents each, by addressing the "Commissioner of Patents, Washington, D. C."